United States Patent [19]
Shiao

[11] Patent Number: 6,012,229
[45] Date of Patent: Jan. 11, 2000

[54] COMBINED LEVELING DEVICE AND LASER POINTER

[76] Inventor: Hsuan-Sen Shiao, No. 15-1, La. 369, Min-Chuan Rd., Taichung, Taiwan

[21] Appl. No.: 09/048,230

[22] Filed: Mar. 26, 1998

[51] Int. Cl.[7] .............................. G01C 9/00; G01C 15/02
[52] U.S. Cl. ............................... 33/365; 33/227; 33/281; 33/451; 33/DIG. 21
[58] Field of Search .............................. 33/365, 281, 227, 33/282, 283, 285, 286, 451, 383, 384, 385, 386, 387, 388, 389, DIG. 21

[56] References Cited

U.S. PATENT DOCUMENTS

| | | | |
|---|---|---|---|
| 3,894,342 | 7/1975 | Goode | 33/388 |
| 5,519,942 | 5/1996 | Webb | 33/281 |
| 5,531,031 | 7/1996 | Green | 33/365 |
| 5,842,282 | 12/1998 | Ting | 33/282 |
| 5,864,956 | 2/1999 | Dong | 33/227 |

*Primary Examiner*—Christopher W. Fulton
*Attorney, Agent, or Firm*—Baker & Botts, L.L.P

[57] ABSTRACT

A combined leveling device and laser pointer includes a support body which holds a bubble tube and a rotary seat. The rotary seat extends from a front face to a rear face of the support body and has a through-hole which extends from the front face to the rear face and which includes a tapered clamping hole section that is tapered in a direction from the rear face to the front face. The rotary seat is graduated adjacent to the front face, and a clamp is movably provided in the through-hole. The clamp has a plurality of resilient clamp members which are resiliently movable toward or away from one another when the clamp moves into or outward from the tapered clamping hole section. A detachable laser light source unit is insertable into the clamp from the rear face so as to be clamped removably by the resilient clamp members. A hologram is mounted to the rotary seat adjacent to the front face to produce a one-dimensional linear projection image from the laser light source unit. After the laser light source unit is inserted into the clamp, the clamp is fixed in the tapered clamping hole section, thereby firmly holding the laser light source unit.

8 Claims, 5 Drawing Sheets

COMBINED LEVELING DEVICE AND LASER POINTER

BACKGROUND OF THE INVENTON

1. Field of the Invention

This invention relates to a combined leveling device and laser pointer, particularly to one which has a laser light source unit removably associated with a leveling device.

2. Brief Description of the Related Art

It is known to combine a leveling instrument with a laser pointer for producing a linear projection image on the surface of an object or a wall so as to provide a marking line of predetermined inclining angle relative to a horizontal line. Based on the marking line, woodwork can be formed with inclined surfaces of predetermined angles.

Referring to FIG. 1, an instrument of the above-mentioned type is shown as having an elongated body 1 of rectangular cross-section with one end portion provided with a laser pointer 2 and the other end provided with an angle-measuring device 3. A bubble tube 4 is mounted to an intermediate part of the elongated body 1. The laser pointer 2 has a rotary seat 2a which holds a laser light source 2b and a hologram 2c disposed in front of the laser light source so as to produce a linear projection image on the surface of an object or a wall. A stationary graduated disk 2d is provided around the rotary seat 2a, and the rotary seat 2a may be rotated to an angle by referring to the graduations on the graduated disk 2d for adjustment of the inclination of the linear projection image relative to a horizontal line. The angle-measuring device 3 includes a circular housing 3a which is mounted rotatably on the body 1 and which houses a second bubble tube 3b. A pointer 1a is mounted to the body 1 and graduation marks are provided along the circumference of the circular housing 3a.

In use, the planar face 1b of the bottom side of the body 1 is placed on the surface of an object and is used as a reference face for the laser pointer 2 and the angle-measuring device 3. The laser pointer 2 is used to produce a linear projection image, while the angle-measuring device 3 functions to measure the angle of an inclined surface. The bubble tube 4 is used to determine whether or not a surface is horizontal. Although the instrument as mentioned above is multi-functional, it is still unsatisfactory because the delicate and expensive laser light source unit 2b is not detachable from the support body 1 of the instrument when it is not in use. Since the instrument is used in carpentry where it is not unusual for the instrument to be subjected to impact forces induced upon being dropped or upon collision, the laser light source unit is prone to damage.

SUMMARY OF THE INVENTION

A primary object of the invention is to provide a combined leveling device and laser pointer with a detachable laser light source unit that can be used independently or stored separately from its supporting body for protection against damage.

Another object of the invention is to provide a combined leveling device and laser pointer with a detachable laser light source unit for ease of replacement.

According to the present invention, a combined leveling device and laser pointer comprises: a first bubble tube; a support body having a leveling flat bottom face, a front face and a rear face, the support body holding the first bubble tube above the leveling flat bottom face; a rotary seat mounted rotatably on the support body and extending from the front face to the rear face, the rotary seat having a through-hole which extends from the front face to the rear face and which includes a tapered clamping hole section that is tapered in a direction from the rear face to the front face; graduations provided circumferentially on the rotary seat adjacent to the front face; a clamp movably provided in the through-hole and having a plurality of resilient clamp members, the resilient clamp members being resiliently movable toward or away from one another when the clamp moves into or outward from the tapered clamping hole section; a laser light source unit which is insertable into the clamp from the rear face so as to be clamped removably by the resilient clamp members, the laser light source unit having a laser light outlet to be disposed adjacent to the front face when the laser light source unit is clamped; a hologram mounted to the rotary seat adjacent to the front face so as to produce a one-dimensional linear projection image from the laser light source unit; and locking means provided on the clamp to lock the clamp against release movement from the through-hole after the laser light source unit is clamped by the resilient clamp members.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
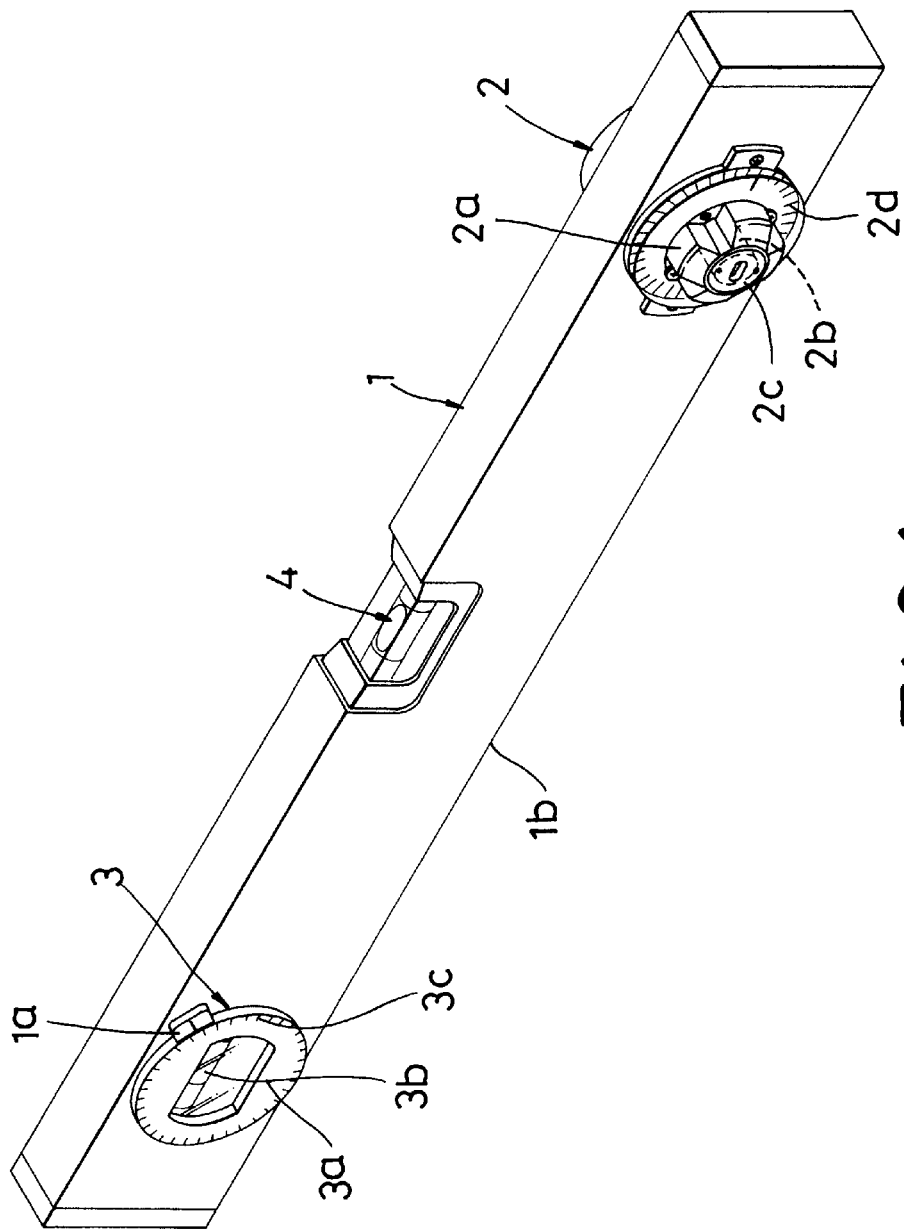
FIG. 1 shows a conventional combined leveling device and laser pointer.
Figure 2:
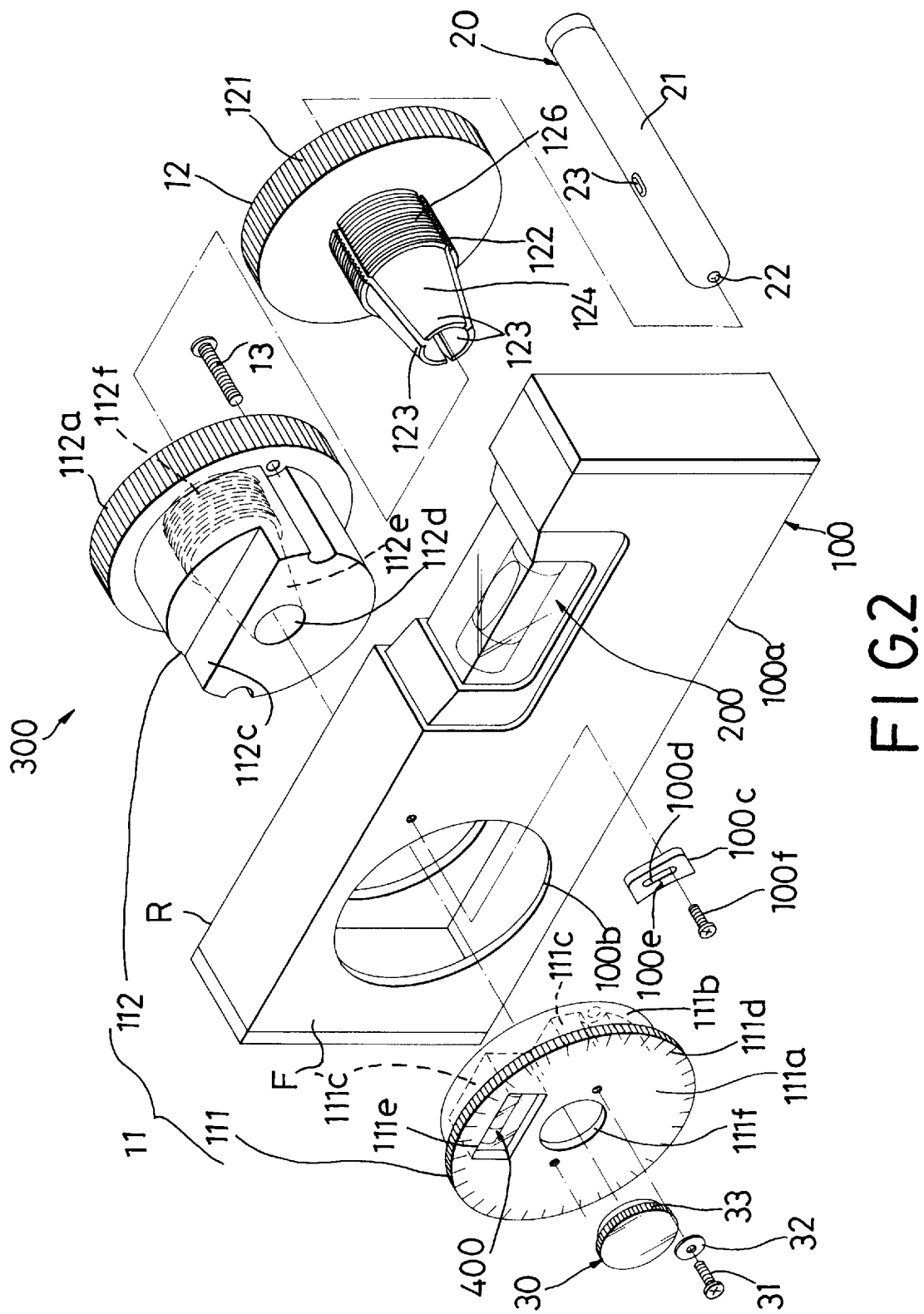
FIG. 2 is an exploded view of a combined leveling device and laser pointer embodying the present invention.
Figure 3:
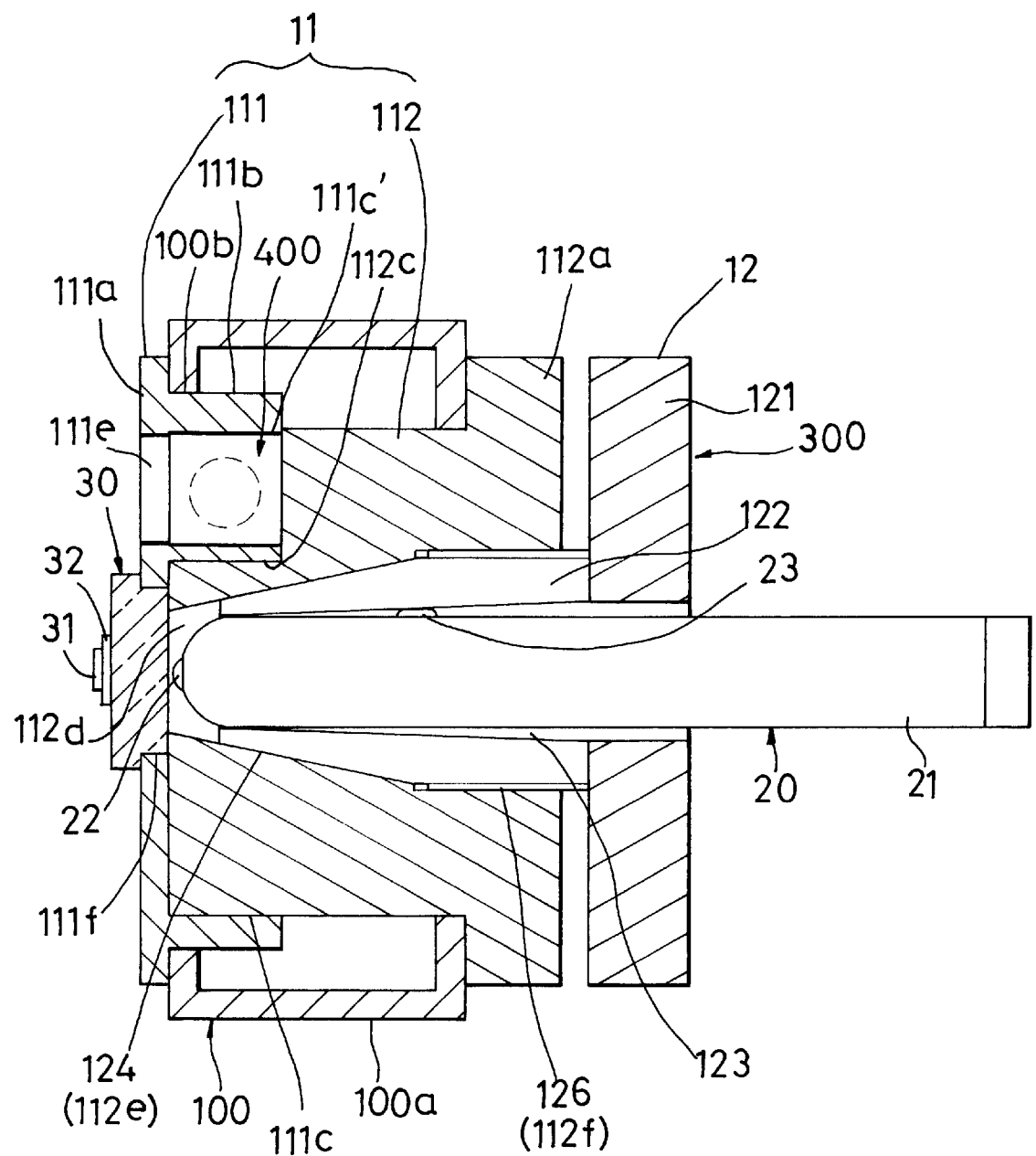
FIG. 3 is a section view of the combined leveling device and laser pointer of FIG. 2.

Referring to FIGS. 2 and 3, a combined leveling device and laser pointer embodying the present invention is shown to comprise a support body 100 of substantially rectangular cross-section, and a first bubble tube 200 and a laser pointer 300 which are mounted on the support body 100 adjacent to two ends of the support body 100.

The support body 100 has a leveling flat bottom face 100a to serve as a reference face, and a circular bore 100b. A pointer plate 100c is mounted to the support body 100 close to the circumferential edge that confines the bore 100b. The pointer plate 100c is provided with a pointing mark 100e and is held in position by means of a screw 100f which passes through a curved oblong hole 100d of the pointer plate 100c. The first bubble tube 200 is mounted to the support body 100 above the flat bottom face 100a.

The laser pointer 300 includes a rotary seat 11, a clamp 12, a laser light source unit 20 removably mounted to the rotary seat 11 via the clamp 12, and a hologram 30. The rotary seat 11 is received rotatably in the circular bore 100b and is constituted by a front cover part 111, which is provided at a front face (F) of the support body 100, and a rotary insert part 112 which is inserted from a rear face (R) of the support body 100 to a front face (F) through the circular bore 100b and is connected to the front cover part 111. The front cover part 111 has a circular face plate 111a disposed in contact with the front face (F) of the support body 100 and a hollow cylindrical portion 111b which extends rearward from the face plate 111a to extend into a portion of the circular bore 100b. The hollow cylindrical portion 111b has a cavity portion 111c' which receives a second bubble tube 400, and a sleeve portion 111c below the cavity portion 111c'. The face plate 111a has an opening 111f which is communicated with the sleeve portion 111c, and a rectangular window 111e formed adjacent to the cavity portion 111c' to permit viewing of the second bubble tube 400. Graduations 111d are provided circumferentially on the circular face plate 111a.

The rotary insert part 112 of the rotary seat 11 is hollow and substantially cylindrical, and has an enlarged rear rotary disc 112a with a cross-section greater than the rotary insert part 112. The rotary insert part 112 has an indentation 112c. After the front end of the rotary insert part 112 is inserted into the sleeve portion 111c of the front cover part 111, the cavity portion 111c' is received in the indentation 112c of the rotary insert part 112, and the front cover part 111 and the rotary insert part 112 are fastened together via screws 13. The rotary insert part 112 has a through-hole 112d which extends from the front face (F) to the rear face (R) and has a tapered clamping hole section 112e and a cylindrical hole section 112f that is threaded.

The clamp 12 has a circular rear rotary handle 121 and a hollow wall 122 which projects forwardly from the rear rotary handle 121. The hollow wall 122 has an externally threaded cylindrical section 126 and a tapered section 124, and is axially split from the externally threaded cylindrical section 126 to the front end of the tapered section 124 to form three resilient clamp members 123. The hollow wall 122 of the clamp 12 is detachably inserted into the through-hole 112d of the rotary insert part 112. After the cylindrical section 126 is threaded into the threaded cylindrical hole section 112f to cause the resilient clamp members 123 to enter completely into the tapered clamping hole section 112e of the through-hole 112d, the resilient clamp members 123 converge to a clamping position and are fitted firmly in the clamping hole section 112e.

The laser light source unit 20 used in the invention is a commercially available pen-shaped laser light source which has a pen-shaped body 21 with a laser light outlet 22 and a switch 23. In assembly, the laser light source unit 20 is inserted into the split hollow wall 122 through the enlarged rear rotary handle 121 before the threaded cylindrical section 126 engages completely the threaded cylindrical hole section 112f of the through-hole 112d. When the split hollow wall 122 is inserted into the tapered clamping hole section 112e of the through-hole 112d until the laser light outlet 22 reaches the opening 111f, the pen-shaped body 21 is firmly clamped by the resilient clamp members 23, and the switch 23 on the pen-shaped body 21 is pressed by the split hollow wall 122, thereby actuating the laser light source unit 20.

The hologram 30 is conventional and is disposed at the opening 111f in the face plate 111a. The hologram 30 is attached to the face plate 111a by means of screws 31 and washers 32 which clamp the hologram 30 tightly against the front surface of the face plate 111a. The periphery of the hologram 30 is provided with a knurled surface 33 for handling purposes.

Figure 4:
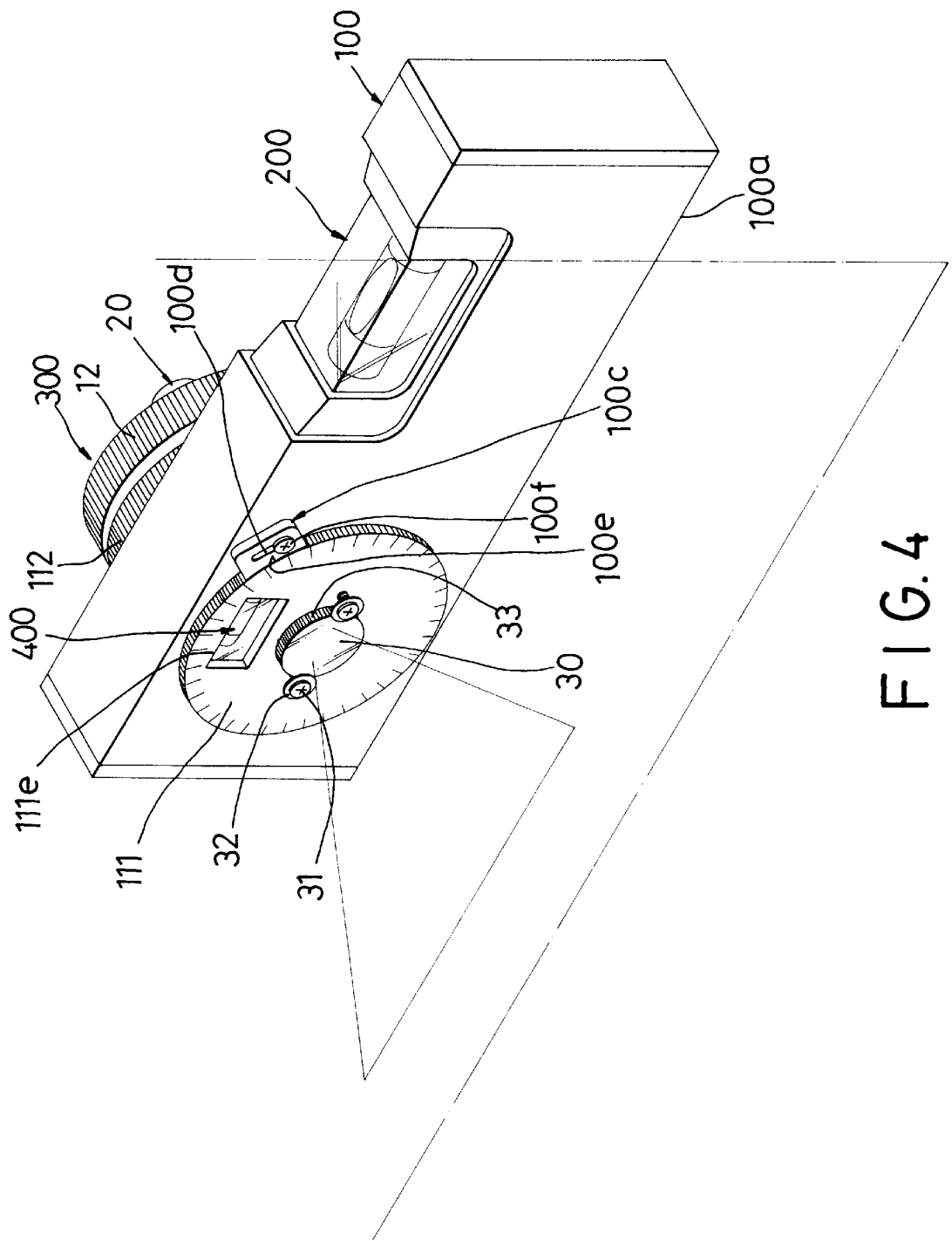
FIGS. 4 and 5 show how the combined leveling device and laser pointer of FIG. 2 is used.

FIG. 4 shows an operating position of the combined leveling device and laser pointer of the present invention, wherein the flat bottom face 111a of the support body 100 is placed on a horizontal surface, and the laser pointer 300 produces a light beam to form a linear projection image on the vertical surface of a wall or an object. Whether or not the flat bottom face 100a is horizontal is determined by the first bubble tube 200. The inclining angle of the linear projection image relative to a horizontal line is shown by the graduations 111d on the face plate 111a as indicated by the pointing mark 100e of the pointer plate 100c.

Figure 5:
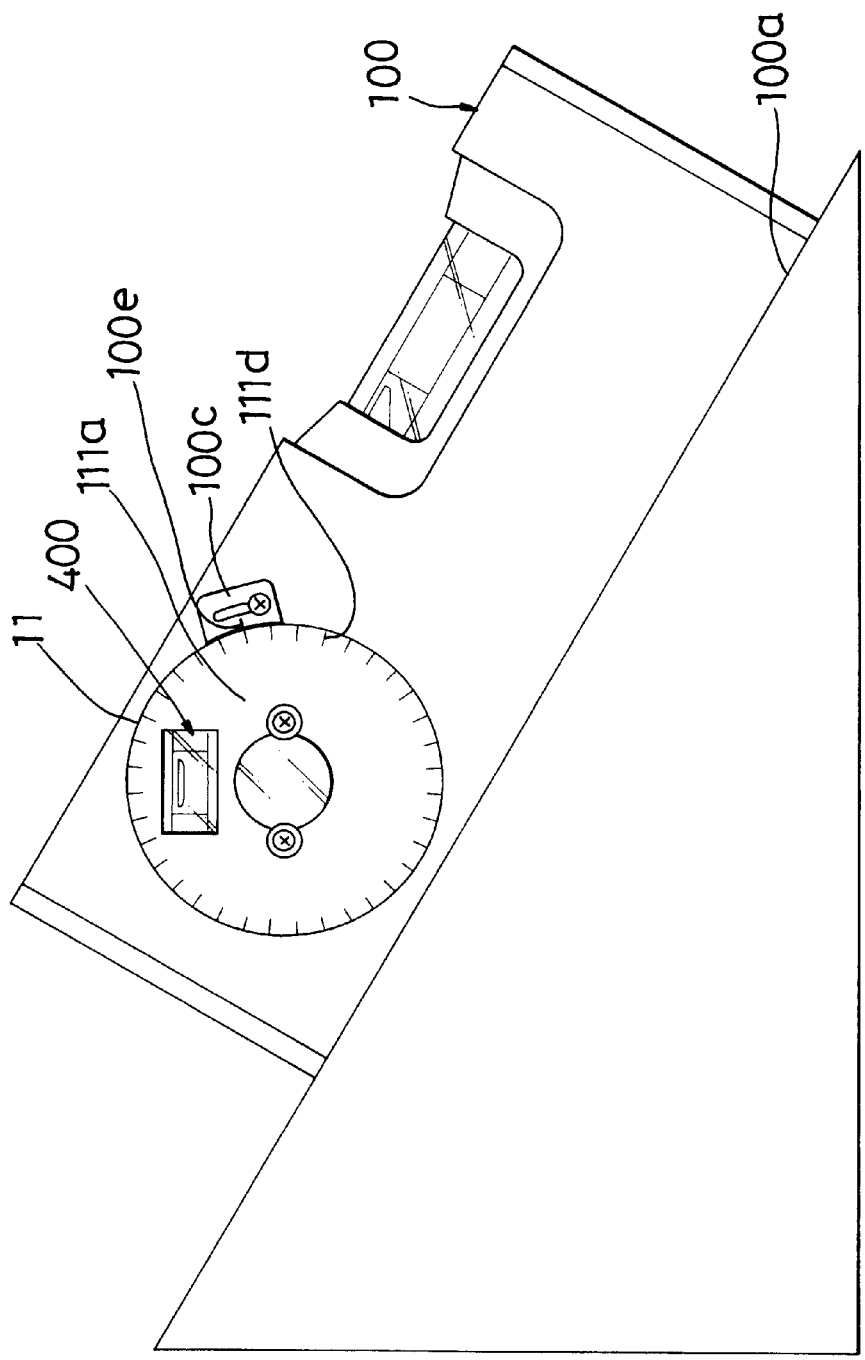

FIG. 5 shows another operating position of the combined leveling device and laser pointer embodying the present invention, wherein the flat bottom face 111a of the support body 100 is placed on an inclined surface. The inclining angle of the inclined surface is measured by turning the rotary seat 11 until the second bubble tube 400 is horizontal and by reading the graduations as pointed by the pointing mark 100e of the pointer plate 100c.

After assembly of the combined leveling device and laser pointer in a factory, examination and correction should be made with reference to the flat bottom face 100a, which is used as a reference face, so as to ascertain that: (1) the first bubble tube 200 is correctly placed in a horizontal position; and (2) the second bubble tube 400 is placed in an accurate position relative to the graduations on the face plate 111a. Afterwards, the pointer plate 100c is shifted and adjusted via the oblong hole 100d so as to set the pointing mark 100e at zero while both the first and second bubble tubes 200 and 400 are placed horizontally. Finally, the orientation of the hologram 30 is inspected so as to ensure that the linear projection image produced thereby is horizontal when the flat bottom face 100a is horizontal. The correction in this respect is made by loosening the screws 31 and by rotating and adjusting the hologram 30 until the linear projection image thereof become horizontal.

The present invention provides the following advantages:

(1) When the laser light source unit 20 is not in use, it can be removed easily from the support body 100 and carried by the user as a pen, thereby protecting the laser light source unit 20 against accidental impact forces which can damage the laser light source unit 20.

(2) The laser light source unit 20 may be replaced easily in case of damage.

(3) The clamp 12 is suitable for various pen-shaped laser light source units which are differently sized by different manufacturers.

(4) The laser light source unit 20 can be used independently as a pointer for addressing or pointing some important matters when in a meeting or when giving a speech.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What I claim is:

1. A combined leveling device and laser pointer comprising:
   a first bubble tube;
   a support body having a leveling flat bottom face, a front face and a rear face, said support body holding said first bubble tube above said leveling flat bottom face;
   a rotary seat mounted rotatably on said support body and extending from said front face to said rear face, said rotary seating having a through-hole which extends from said front face to said rear face and which includes a tapered clamping hole section that is tapered in a direction from said rear face to said front face;
   graduations provided circumferentially on said rotary seat adjacent to said front face;

a clamp movably provided in said through-hole and having a plurality of resilient clamp members, said resilient clamp members being resiliently movable toward or away from one another when said clamp moves into or outward from said tapered clamping hole section;

a laser light source unit which is insertable into said clamp from said rear face so as to be clamped removably by said resilient clamp members;

a hologram mounted to said rotary seat adjacent to said front face to produce a one-dimensional linear projection image from said laser light source unit; and locking means provided on said clamp to releasably lock said clamp against release movement from said through-hole after said laser light source unit is clamped by said resilient clamp members.

2. The combined leveling device and laser pointer according to claim 1, wherein said laser light source unit is configured to be pen-shaped.

3. The combined leveling device and laser pointer according to claim 2, wherein said clamp further has a rear rotary handle disposed outwardly of said through-hole, and a hollow wall which extends forwardly from said rear rotary handle to extend into said through-hole, said hollow wall having a tapered section and a cylindrical section formed between said rear rotary handle and said cylindrical section, said hollow wall being split from said cylindrical section to said tapered section to form said resilient clamp members.

4. The combined leveling device and laser pointer according to claim 3, wherein said cylindrical section of said hollow wall is an externally threaded cylindrical section which serves as said locking means, said through-hole further having a cylindrical hole section which is threaded to engage said externally threaded cylindrical section and which is formed rearwardly of said tapered clamping hole section.

5. The combined leveling device and laser pointer according to claim 4, wherein said rotary seat has a front cover part and a rotary insert part which is formed with said through-hole and which extends into said support body, said rotary insert part having an enlarged rear rotary disc disposed outwardly of said rear face of said support body, said front cover part having a circular face plate disposed on said front face and a hollow cylindrical portion which projects rearward from said circular face plate to extend inwardly of said front face for connecting with said rotary insert part.

6. The combined leveling device and laser pointer according to claim 5, further comprising a pointer plate mounted on said support body adjacent to the circumference of said circular face plate, said graduation being provided circumferentially on said circular face plate.

7. The combined leveling device and laser pointer according to claim 6, wherein said circular face plate further has a central hole which is communicated with said through-hole and which receives said hologram.

8. The combined leveling device and laser pointer according to claim 7, wherein said front cover part further has a cavity portion in said hollow cylindrical portion, a second bubble tube disposed in said cavity portion, and a window formed in said face plate in alignment with said cavity portion.

* * * * *